US009441698B2

(12) United States Patent
Suzuki et al.

(10) Patent No.: US 9,441,698 B2
(45) Date of Patent: Sep. 13, 2016

(54) HYDRAULIC SHOCK ABSORBING APPARATUS

(71) Applicant: SHOWA CORPORATION, Gyoda-shi (JP)

(72) Inventors: Tatsuro Suzuki, Gyoda (JP); Seiryo Konakai, Gyoda (JP); Mototsugu Yamanaka, Gyoda (JP); Yuichi Enomoto, Gyoda (JP); Takahiro Miura, Gyoda (JP); Kunio Shibasaki, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 75 days.

(21) Appl. No.: 14/012,533

(22) Filed: Aug. 28, 2013

(65) Prior Publication Data

US 2014/0291086 A1 Oct. 2, 2014

(30) Foreign Application Priority Data

Mar. 29, 2013 (JP) ................. 2013-074952

(51) Int. Cl.
*F16F 9/06* (2006.01)

(52) U.S. Cl.
CPC ............... *F16F 9/062* (2013.01); *F16F 9/066* (2013.01)

(58) Field of Classification Search
CPC ......... F16F 9/062; F16F 9/066; F16F 9/063; F16F 9/483; F16F 9/585
USPC ............. 188/322.19, 322.14, 322.2
See application file for complete search history.

(56) References Cited

U.S. PATENT DOCUMENTS

| 2,717,669 | A | * | 9/1955 | Stock | 188/315 |
|---|---|---|---|---|---|
| 3,225,870 | A | * | 12/1965 | Heckethorn | 188/315 |
| 3,447,644 | A | * | 6/1969 | Duckett | F16F 9/48 |
| | | | | | 188/288 |
| 3,722,639 | A | * | 3/1973 | Keijzer et al. | 188/315 |
| 3,904,002 | A | * | 9/1975 | Adrian et al. | 188/269 |
| 3,958,673 | A | * | 5/1976 | Allinquant et al. | 188/322.14 |
| 5,244,064 | A | * | 9/1993 | Furuta | 188/322.19 |
| 5,441,132 | A | * | 8/1995 | Pradel et al. | 188/315 |
| 5,702,091 | A | * | 12/1997 | Perrin | F16F 9/0245 |
| | | | | | 188/280 |
| 5,738,191 | A | * | 4/1998 | Forster | 188/318 |
| 6,260,678 | B1 | * | 7/2001 | Moradmand et al. | 188/322.14 |
| 6,283,259 | B1 | * | 9/2001 | Nakadate | 188/322.2 |
| 6,533,085 | B2 | * | 3/2003 | Moradmand et al. | 188/322.14 |
| 2002/0027050 | A1 | * | 3/2002 | Takakusaki | 188/321.11 |
| 2005/0067240 | A1 | * | 3/2005 | Holiviers et al. | 188/315 |

FOREIGN PATENT DOCUMENTS

JP 59-107348 U 7/1984

* cited by examiner

*Primary Examiner* — Bradley King
(74) *Attorney, Agent, or Firm* — Leason Ellis LLP

(57) ABSTRACT

A hydraulic shock absorbing apparatus includes: an inner tube; and an outer tube that is placed outside the inner tube, in which a space is defined between an outer circumferential surface of the inner tube and an inner circumferential surface of the outer tube, and a protruding portion protruding from the outer circumferential surface of the inner tube toward the outer tube or a protruding portion protruding from the inner circumferential surface of the outer tube toward the inner tube is provided in the space, and the protruding portion is formed over an entire circumference of the outer circumferential surface of the inner tube or the inner circumferential surface of the outer tube, and has a waveform when viewed from a direction crossing the outer circumferential surface or the inner circumferential surface.

7 Claims, 15 Drawing Sheets

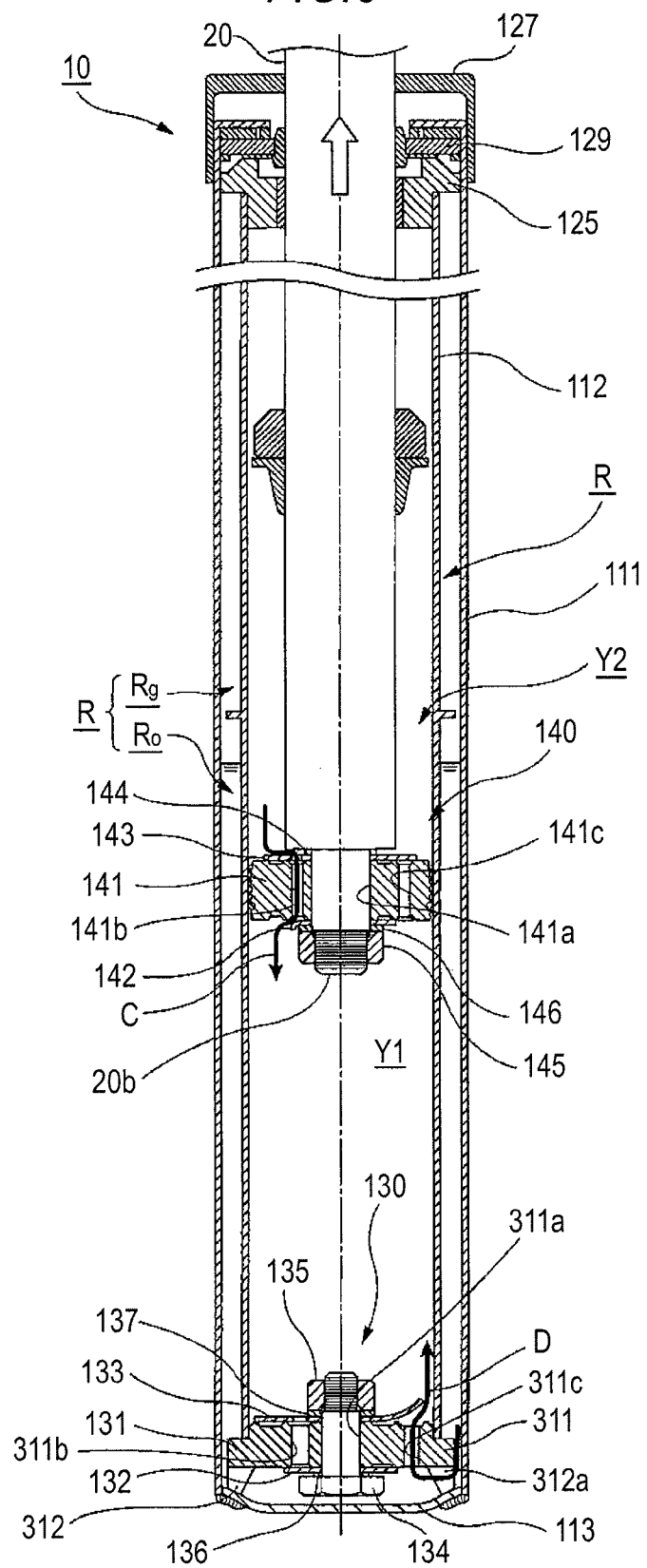

FIG.7A
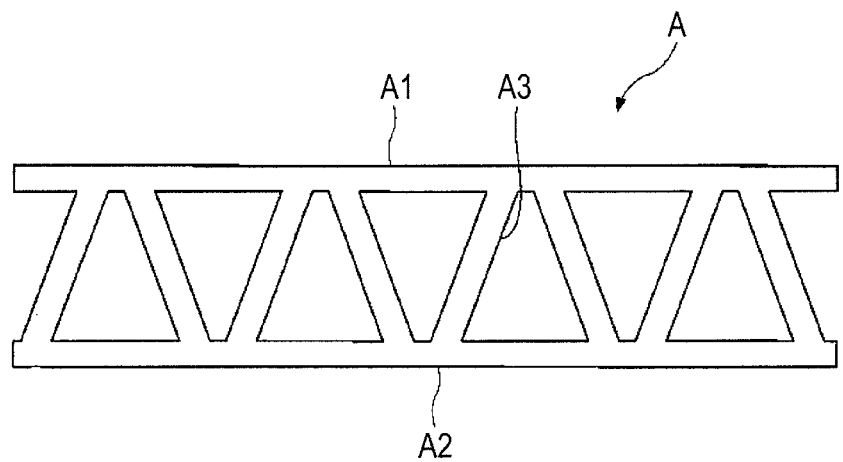
FIG.7B
FIG.7D
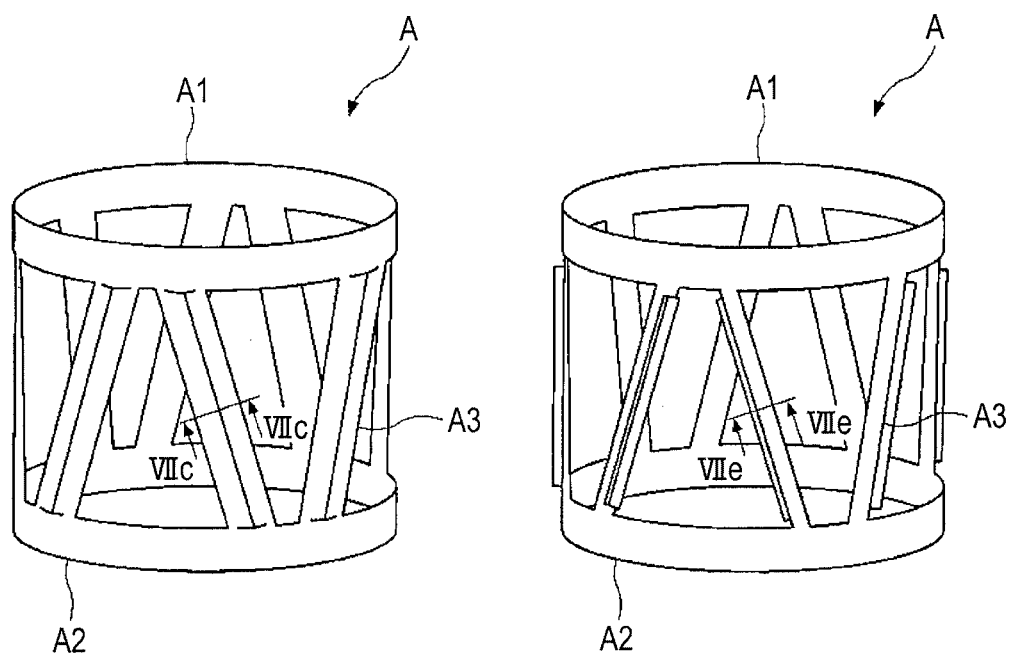
FIG.7C
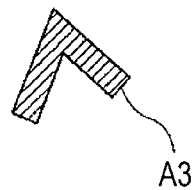
FIG.7E
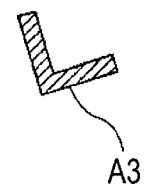

HYDRAULIC SHOCK ABSORBING APPARATUS

CROSS-REFERENCE TO RELATED APPLICATIONS

This application is based on and claims priority under 35 U.S.C 119 from Japanese Patent Application No. 2013-074952 filed on Mar. 29, 2013; the entire content of which is incorporated herein by reference.

BACKGROUND OF INVENTION

1. Technical Field

The present invention relates to a hydraulic shock absorbing apparatus.

2. Related Art

For example, a shock absorber (hydraulic shock absorbing apparatus) disclosed in JP-UM-A-S59-107348 has the following configuration. In other words, the shock absorber (apparatus) includes an inner tube, and an outer tube that is placed with a gap radially outward from the inner tube, in which a lower portion of the gap forms a reservoir chamber for a liquid. The shock absorber also includes a plurality of fins that have a shape of a part of a circular ring and are fixed to one of the inner tube and the outer tube away from the other one of the inner tube and the outer tube. The fins are placed in the reservoir chamber with a gap in a vertical direction from a position where a liquid surface therein is in a neutral position, and are distributed in a circumferential direction so as to form an overall circular shape when viewed from an axial direction of the inner tube. Even when the liquid surface in the reservoir chamber moves up and down, rippling on the liquid surface is suppressed, and generation of air bubbles is prevented since at least of one of the fins is placed on or near the liquid surface.

SUMMARY OF INVENTION

It is desirable that a member or a portion such as a fin that is fixed to one of an inner tube (inner cylinder) and an outer tube (outer cylinder) away from the other one of the inner tube and the outer tube to suppress rippling on a liquid surface and prevent generation of air bubbles can be formed with ease on an outer circumferential surface of the inner tube or an inner circumferential surface of the outer tube.

An object of the present invention is to provide a hydraulic shock absorbing apparatus in which the portion that suppresses the rippling on the liquid surface and prevents the generation of the air bubbles can be formed with ease.

An aspect of the present invention is directed to a hydraulic shock absorbing apparatus including: an inner tube; and an outer tube that is placed outside the inner tube in such a manner as to cover an outer circumferential surface of the inner tube, in which a space is defined between the outer circumferential surface of the inner tube and an inner circumferential surface of the outer tub; and a liquid and gas are filled in the space, and a protruding portion protruding from the outer circumferential surface of the inner tube toward the outer tube or a protruding portion protruding from the inner circumferential surface of the outer tube toward the inner tube is provided in the space, and the protruding portion is formed over an entire circumference of the outer circumferential surface of the inner tube or the inner circumferential surface of the outer tube, and has a waveform when viewed from a direction crossing the outer circumferential surface or the inner circumferential surface.

The hydraulic shock absorbing apparatus may have a configuration in which the protruding portion is molded by a pair of dies that slide in opposite directions from each other in a center line direction of the inner tube or the outer tube.

The hydraulic shock absorbing apparatus may have a configuration in which convex portions are formed in the protruding portion at regular intervals in a circumferential direction of a center line of the inner tube or the outer tube in such a manner that a width of an opening that is opened toward the one end portion side gradually decreases in the center line direction from the one end portion side of the inner tube or the outer tube in the center line direction toward the other end portion side.

Another aspect of the present invention is directed to a hydraulic shock absorbing apparatus including: an inner tube; an outer tube that is placed outside the inner tube in such a manner as to cover an outer circumferential surface of the inner tube; and an annular protruding member disposed in a space that is defined between the outer circumferential surface of the inner tube and an inner circumferential surface of the outer tube, and in which a liquid and gas are filled, in which the protruding member has at least one of a first configuration and a second configuration, in the first configuration, an outer diameter of one end portion side of the protruding member in a center line direction of the protruding member is larger than an outer diameter of the other end portion side, and in the second configuration, an inner diameter of the one end portion side of the protruding member in the center line direction of the protruding member is smaller than an inner diameter of the other end portion side, and notches each extending from the other end portion side toward the one end portion side are formed in the protruding member in a circumferential direction of the protruding member.

Still another aspect of the present invention is directed to a hydraulic shock absorbing apparatus including: an inner tube; an outer tube that is placed outside the inner tube in such a manner as to cover an outer circumferential surface of the inner tube; and an annular protruding member disposed in a space that is defined between the outer circumferential surface of the inner tube and an inner circumferential surface of the outer tube, and in which a liquid and gas are filled, in which the protruding member has at least one of a first configuration and a second configuration, in the first configuration, protruding portions each protruding from an outer circumferential surface and extending over a circumferential direction of the protruding member are provided in a center line direction of the protruding member, and in the second configuration, protruding portions each protruding from an inner circumferential surface and extending over the circumferential direction are provided in the center line direction, and immersion portions each being immersed in part of the protruding portion in the circumferential direction are formed in the protruding portions, and a position of the immersion portion formed in a first one of the protruding portions in the circumferential direction are shifted from a position of the immersion portion formed in a second one of the protruding portions.

Yet another aspect of the present invention is directed to a hydraulic shock absorbing apparatus including: an inner tube; an outer tube that is placed outside the inner tube in such a manner as to cover an outer circumferential surface of the inner tube; and an annular protruding member disposed in a space that is defined between the outer circumferential surface of the inner tube and an inner circumferential surface of the outer tube, and in which a liquid and gas are filled, in which the protruding member has at least one of a first configuration and a second configuration, in the first configuration, circumferential direction portions that extend in a circumferential direction of the protruding member and bent portions that continue to the circumferential direction portions and extend in a center line direction of the protruding member form a flow path on an outer circumferential surface, and in the second configuration, circumferential direction portions that extend in the circumferential direction and bent portions that continue to the circumferential direction portions and extend in the center line direction form a flow path on an inner circumferential surface.

Still yet another aspect of the present invention is directed to a hydraulic shock absorbing apparatus including: an inner tube; an outer tube that is placed outside the inner tube in such a manner as to cover an outer circumferential surface of the inner tube; and an annular protruding member disposed in a space that is defined between the outer circumferential surface of the inner tube and an inner circumferential surface of the outer tube, and in which a liquid and gas are filled, in which notches each extending from one end portion side in a center line direction of the protruding member toward the other end portion side are formed in the protruding member in a circumferential direction of the protruding member.

The hydraulic shock absorbing apparatus may have a configuration in which the protruding member the protruding member has at least one of a first configuration and a second configuration, in the first configuration, the protruding member is formed with a concave portion that is disposed at a position which continues to a tip end of the other end portion side in the notch and is disposed on an outer circumferential surface side of the protruding member, and in the second configuration, the protruding member is formed with a concave portion that is disposed at a position which continues to a tip end of the other end portion side in the notch and is disposed on an inner circumferential surface side of the protruding member.

According to the aspects of the present invention, a portion that suppresses rippling on a liquid surface and prevents generation of air bubbles can be formed with ease.

BRIEF DESCRIPTION OF DRAWINGS

FIG. 3 is a diagram showing the flow of the oil during an expansion stroke of the hydraulic shock absorbing apparatus.

FIGS. 7A to 7E are diagrams showing an object according to another embodiment 2.

DESCRIPTION OF EMBODIMENTS

Hereinafter, embodiments of the present invention will be described referring to the accompanying drawings.

Figure 1:
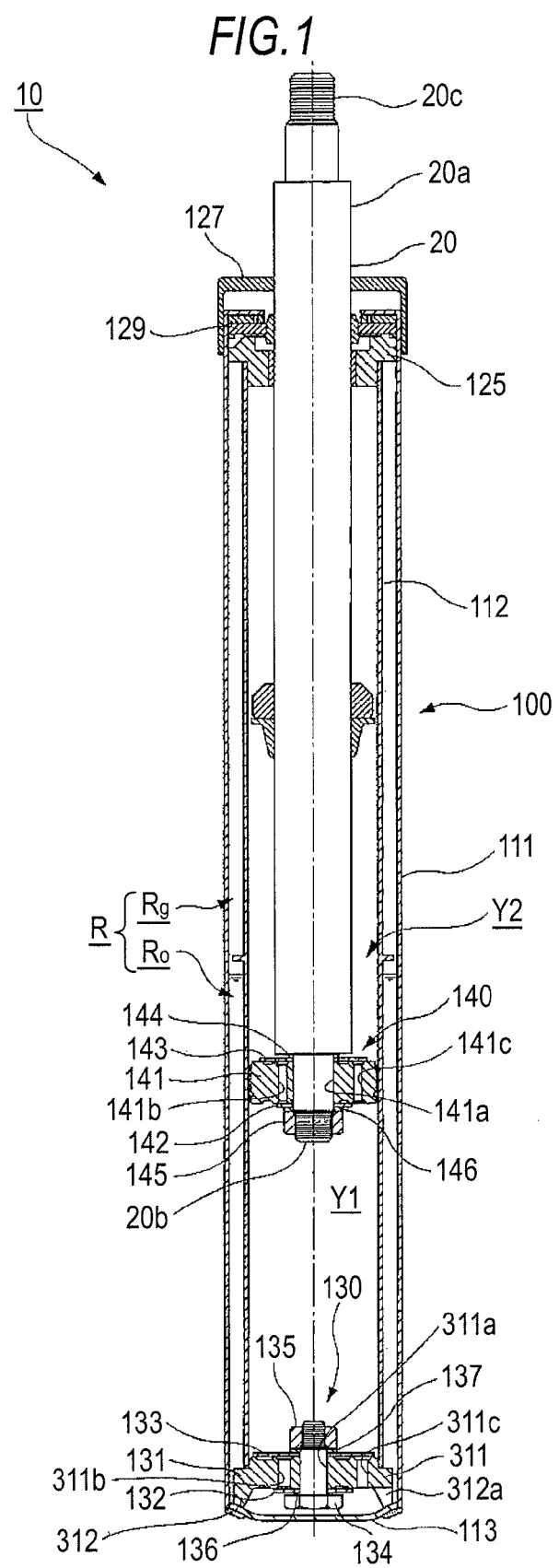
FIG. 1 is a schematic configuration diagram showing a hydraulic shock absorbing apparatus according to an embodiment.

FIG. 1 is a schematic configuration diagram showing a hydraulic shock absorbing apparatus 10 according to an embodiment.

The hydraulic shock absorbing apparatus 10 according to the embodiment is a twin tube type hydraulic shock absorbing apparatus forming a part of a strut type suspension.

As shown in FIG. 1, the hydraulic shock absorbing apparatus 10 includes a cylinder 100 that has a thin cylinder-shaped outer cylinder 111, a thin cylinder-shaped inner cylinder 112 which is accommodated in the outer cylinder 111, and a bottom cover 113 which blocks one end portion in a center line direction (vertical direction in FIG. 1) of a cylinder of the cylinder-shaped outer cylinder 111. Hereinafter, the center line direction of the cylinder of the outer cylinder 111 is simply referred to as the center line direction.

Also, the hydraulic shock absorbing apparatus 10 includes a piston 141 that is inserted into the inner cylinder 112 in such a manner as to be movable in the center line direction, a piston rod 20 that extends in the center line direction and supports the piston 141 in one end portion (lower end portion in FIG. 1) in the center line direction, and a rod guide 125 that is placed inside the outer cylinder 111 and guides the piston rod 20. The piston 141 is in contact with an inner circumferential surface of the inner cylinder 112, and divides a space in the inner cylinder 112 where a liquid (oil in the embodiment) is sealed into a first oil chamber Y1 further toward the one end portion side in the center line direction than the piston 141, and a second oil chamber Y2 further toward the other end portion side in the center line direction than the piston 141.

Also, the hydraulic shock absorbing apparatus 10 includes a bump stopper cap 127 that causes the piston rod 20 to slide and is mounted on the other end portion in the center line direction of the outer cylinder 111. Also, the hydraulic shock absorbing apparatus 10 includes an oil seal 129 that is disposed on a side opposite to the piston 141 with respect to the rod guide 125 inside the bump stopper cap 127. The oil seal is an example of a sealing member that prevents the liquid from leaking in the cylinder 100 and prevents foreign matters from entering the cylinder 100.

Also, the hydraulic shock absorbing apparatus 10 includes a first valve device 130 that is placed in one end portion in the center line direction of the inner cylinder 112, and a second valve device 140 that is placed in one end portion in the center line direction of the piston rod 20.

Hereinafter, each component will be described in detail.

In the cylinder 100, the length in the center line direction of the outer cylinder 111 is longer than the length of the inner cylinder 112, and the inner cylinder 112 is placed concentrically with the outer cylinder 111. In other words, the one end portion in the center line direction of the inner cylinder 112 is supported by the one end portion in the center line direction of the outer cylinder 111 via the bottom cover 113 and a valve body 131 which is a component forming the first valve device 130 and will be described later. Meanwhile, the other end portion in the center line direction of the inner cylinder 112 is supported by the rod guide 125. In this manner, the inner cylinder 112 is placed concentrically with the outer cylinder 111 in such a manner that a gap between an outer circumference of the inner cylinder 112 and an inner circumference of the outer cylinder 111 is constant in the center line direction. A reservoir chamber R is defined by an outer circumferential surface of the inner cylinder 112 and an inner circumferential surface of the outer cylinder 111. In the hydraulic shock absorbing apparatus 10 according to the embodiment, an inner portion of the reservoir chamber R is partitioned into an oil chamber Ro where the oil is sealed, and a gas chamber Rg where air, inert gas or the like is sealed. In this manner, the reservoir chamber R is defined between the outer circumferential surface of the inner cylinder 112 and the inner circumferential surface of the outer cylinder 111, and functions as an example of a space in which the oil and the gas are filled. As shown in FIG. 1, the first valve device 130 is divided into the first oil chamber Y1 and the reservoir chamber R by the valve body 131 which will be described later.

Also, the bottom cover 113 is mounted on the one end portion in the center line direction of the outer cylinder 111, and a position of the inner cylinder 112 in the center line direction is determined via the oil seal 129, the rod guide 125, the first valve device 130 and the like by closing the other end portion in the center line direction of the outer cylinder 111 by roll caulking in a radially inward direction.

The piston 141 is a columnar member that has a plurality of oil passages which are formed in the center line direction, and forms a part of the second valve device 140. The piston 141 and the second valve device 140 will be described in detail later.

The piston rod 20 is a solid or hollow member, and has a columnar-shaped or cylinder-shaped rod portion 20a, a one side mounting portion 20b that is used to mount the piston 141 in the one end portion in the center line direction, and the other side mounting portion 20c that is used to mount the piston rod 20 on a vehicle body or the like in the other end portion in the center line direction. On outer surfaces of tip ends of the one side mounting portion 20b and the other side mounting portion 20c, spiral-shaped grooves are cut and external threads are formed to function as a bolt.

Next, the first valve device 130 and the second valve device 140 will be described.

The first valve device 130 includes the valve body 131 that has a plurality of oil passages which are formed in the center line direction, a first valve 132 that blocks one end portion in the center line direction of some of the oil passages among the plurality of oil passages which are formed in the valve body 131, and a second valve 133 that blocks the other end portion in the center line direction of some of the oil passages among the plurality of oil passages which are formed in the valve body 131. Also, the first valve device 130 includes a bolt 134 and a nut 135 that are used to form the valve body 131, the first valve 132, and the second valve 133, which are configured separately, into a single unit. Also, the first valve device 130 includes a washer 136 that is placed between a head of the bolt 134 and the first valve 132, and a washer 137 that is placed between the nut 135 and the second valve 133.

The valve body 131 has a disk-shaped portion 311 that has a disk shape, and a cylindrical-shaped portion 312 that has a cylindrical shape that extends in the center line direction from a radially outermost portion of the disk-shaped portion 311. The valve body divides the closed space in the cylinder 100.

In the disk-shaped portion 311, a bolt hole 311a that is formed in the center line direction so that a shaft 134a of the bolt 134 passes therethrough, a first oil passage 311b that is formed in the center line direction at a further radially outward portion than the bolt hole 311a, and a second oil passage 311c that is formed in the center line direction at a further radially outward portion than the first oil passage 311b are formed. The first oil passage 311b and the second oil passage 311c are formed in a plural number (four in the embodiment) at regular intervals in a circumferential direction, and function as communications passages that communicate the first oil chamber Y1 with the reservoir chamber R. When viewed from a center of a radial direction, the first oil passage 311b and the second oil passage 311c are not formed in the same direction but the first oil passage 311b and the second oil passage 311c are formed at positions relatively shifted from each other in the circumferential direction. Each opening end of the first oil passage 311b and the second oil passage 311c is formed at a position lower than an end surface in a center line direction of the disk-shaped portion 311. In other words, in one end portion in the center line direction of the disk-shaped portion 311, each of the areas where the first oil passage 311b and the second oil passage 311c are formed is recessed in a ring shape. Also, in the other end portion in the center line direction of the disk-shaped portion 311, each of the areas where the first oil passage 311b and the second oil passage 311c are formed is recessed in a ring shape.

Also, the disk-shaped portion 311 has a step portion that is further recessed than an end surface on a radially center side in an outermost diameter portion of the other end portion in the center line direction. The step portion is in contact with the one end portion in the center line direction of the inner cylinder 112, and thus the position of the inner cylinder 112 in the center line direction is determined.

The cylindrical-shaped portion 312 has a plurality (four in the embodiment) of concave portions 312a on the one end portion side in the center line direction, which are recessed from the end surface at regular intervals in the circumferential direction. The concave portion 312a communicates an inner portion of the cylindrical-shaped portion 312 with the reservoir chamber R.

The first valve 132 is a disk-shaped member where a bolt hole is formed so that the shaft of the bolt 134 passes therethrough. An outer diameter of the first valve 132 is large enough to block the first oil passage 311b, and is set to have a size that opens the second oil passage 311c.

The second valve 133 is a disk-shaped member where a bolt hole is formed so that the shaft of the bolt 134 passes therethrough. An outer diameter of the second valve 133 is set to have a size that blocks the second oil passage 311c. Also, in the second valve 133, a plurality (nine in the embodiment) of oil holes are formed at regular intervals in the circumferential direction at a position corresponding to the first oil passage 311b when viewed from the center of the radial direction.

The washer 136 is a disk-shaped member where a bolt hole is formed so that the shaft of the bolt 134 passes therethrough. The washer 136 is placed between the head of the bolt 134 and the first valve 132, and thus a gap equal to a thickness of the washer 136 is generated between the head of the bolt 134 and the first valve 132.

The washer 137 is a disk-shaped member where a bolt hole is formed so that the shaft of the bolt 134 passes therethrough. The washer 137 is placed between a head of the nut 135 and the second valve 133, and thus a gap equal to a thickness of the washer 137 is generated between the nut 135 and the second valve 133.

The second valve device 140 includes the above-described piston 141, a first valve 142 that blocks one end portion in the center line direction of some of the oil passages among the plurality of oil passages which are formed in the piston 141, a second valve 143 that blocks the other end portion in the center line direction of some of the oil passages among the plurality of oil passages which are formed in the piston 141, and a washer 144 that is placed between the piston rod 20 and the second valve 143. Also, the second valve device 140 includes the one side mounting portion 20b of the piston rod 20, and a nut 145 that is used to form the piston 141, the first valve 142, the second valve 143, and the washer 144, which are configured separately, into a single unit. A washer 146 is placed between the nut 145 and the first valve 142.

In the piston 141, a bolt hole 141a that is formed in the center line direction so that the one side mounting portion 20b of the piston rod 20 passes therethrough, a first oil passage 141b that is formed in the center line direction at a further radially outward portion than the bolt hole 141a, and a second oil passage 141c that is formed in the center line direction at a further radially outward portion than the first oil passage 141b are formed. The first oil passage 141b and the second oil passage 141c are formed in a plural number (four in the embodiment) at regular intervals in the circumferential direction, and function as communications passages that communicate the first oil chamber Y1 with the second oil chamber Y2. When viewed from the center of the radial direction, the first oil passage 141b and the second oil passage 141c are not formed in the same direction but the first oil passage 141b and the second oil passage 141c are formed at positions relatively shifted from each other in the circumferential direction. Each opening end of the first oil passage 141b and the second oil passage 141c is formed at a position lower than the end surface in the center line direction. In other words, in one end portion in the center line direction of the piston 141, each of the areas where the first oil passage 141b and the second oil passage 141c are formed is recessed in a ring shape. Also, in the other end portion in the center line direction of the piston 141, each of the areas where the first oil passage 141b and the second oil passage 141c are formed is recessed in a ring shape.

The first valve 142 is a disk-shaped member where a bolt hole is formed so that the one side mounting portion 20b of the piston rod 20 passes therethrough. An outer diameter of the first valve 142 is large enough to block the first oil passage 141b, and is set to have a size that opens the second oil passage 141c.

The second valve 143 is a disk-shaped member where a bolt hole is formed so that the one side mounting portion 20b of the piston rod 20 passes therethrough. An outer diameter of the second valve 143 is set to have a size that blocks the second oil passage 141c. Also, in the second valve 143, a plurality (nine in the embodiment) of oil holes are formed at regular intervals in the circumferential direction at a position corresponding to the first oil passage 141b when viewed from the center of the radial direction.

The washer 144 is a disk-shaped member where a bolt hole is formed so that the one side mounting portion 20b of the piston rod 20 passes therethrough. The washer 144 is placed between the one side mounting portion 20b of the piston rod 20 and the second valve 143, and thus a gap equal to a thickness of the washer 144 is generated between the piston rod 20 and the second valve 143.

The washer 146 is a disk-shaped member where a bolt hole is formed so that the one side mounting portion 20b of the piston rod 20 passes therethrough. The washer 144 is placed between the nut 145 of the piston rod 20 and the first valve 142, and thus a gap equal to a thickness of the washer valve 146 is generated between the nut 145 and the first valve 142.

Next, operation of the hydraulic shock absorbing apparatus 10 that has the above-mentioned configuration will be described.

First, the operation of the hydraulic shock absorbing apparatus 10 during a compression stroke will be described.

Figure 2:
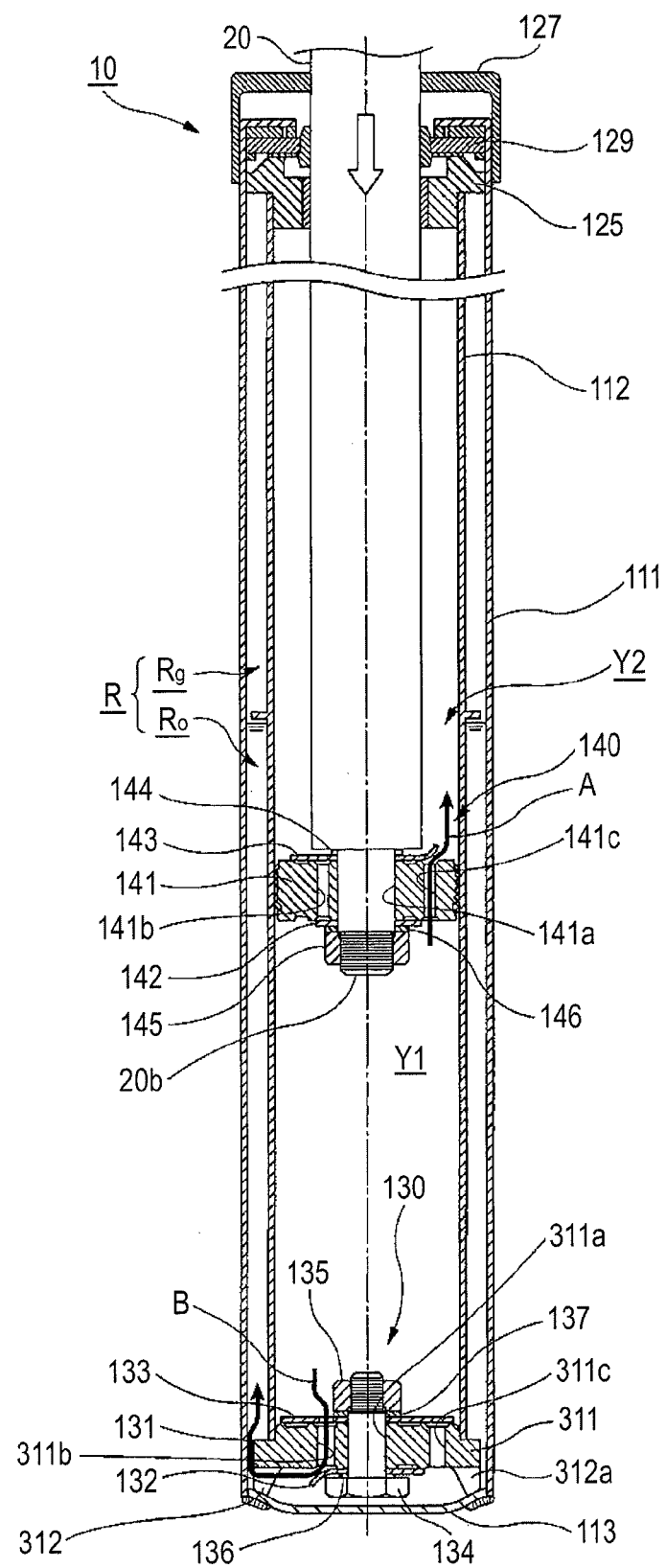
FIG. 2 is a diagram showing the flow of oil during a compression stroke of the hydraulic shock absorbing apparatus.

FIG. 2 is a diagram showing the flow of the oil during the compression stroke of the hydraulic shock absorbing apparatus 10.

When the piston rod 20 moves toward the one end portion side (lower section in FIG. 2) in the center line direction with respect to the cylinder 100 as shown with the white arrow, the piston 141 is moved and the oil in the first oil chamber Y1 is pushed so that pressure of a lower surface of the second valve device 140 increases and high pressure is applied to the second oil passage 141c of the second valve device 140 (refer to FIG. 2). As a result, the second valve 143 that blocks the second oil passage 141c is opened and the oil flows into the second oil chamber Y2 above the second valve device 140 through the second oil passage 141c as shown with the arrow A in FIG. 2. The flow of the oil from the first oil chamber Y1 toward the second oil chamber Y2 is throttled by the second valve 143 and the second oil passage 141c, and a damping force during the compression stroke of the hydraulic shock absorbing apparatus 10 is obtained.

Also, pressure of the first oil chamber Y1 that is increased by the movement of the piston rod 20 in the center line direction toward the one end portion side is applied to the first oil passage 311b of the first valve device 130, and the first valve 132 that blocks the first oil passage 311b is opened. As shown with the arrow B in FIG. 2, the oil in the first oil chamber Y1 flows into the reservoir chamber R that is defined between the inner cylinder 112 and the outer cylinder 111 through the first oil passage 311b of the valve body 131 and the concave portion 312a. The flow of the oil from the first oil chamber Y1 toward the reservoir chamber R is throttled by the first valve 132 and the first oil passage 311b, and the damping force during the compression stroke of the hydraulic shock absorbing apparatus 10 is obtained.

Next, a movement of the hydraulic shock absorbing apparatus 10 during an expansion stroke will be described.

FIG. 3 is a diagram showing the flow of the oil during the expansion stroke of the hydraulic shock absorbing apparatus 10.

When the piston rod 20 moves toward the other end portion side (upper section in FIG. 3) in the center line direction with respect to the cylinder 100 as shown with the white arrow, the first oil chamber Y1 lacks the amount of the oil corresponding to the volume and a negative pressure is generated. In this manner, the oil in the second oil chamber Y2 opens the first valve 142 that blocks the first oil passage 141b through the first oil passage 141b of the second valve device 140, and flows into the first oil chamber Y1 as shown with the arrow C in FIG. 3. The flow of the oil from the second oil chamber Y2 toward the first oil chamber Y1 is throttled by the first valve 142 of the second valve device 140 and the first oil passage 141b, and a damping force during the expansion stroke of the hydraulic shock absorbing apparatus 10 is obtained. In this manner, the expansion side damping force is generated by the first valve 142 of the second valve device 140 and the first oil passage 141*b*, and the expansion side damping force is determined by hardness of the first valve 142, a diameter of the first oil passage 141*b* and the like.

Also, when the piston rod 20 moves in a direction of the white arrow in FIG. 3, the oil in the reservoir chamber R opens the second valve 133 that blocks the second oil passage 311*c* through the concave portion 312*a* of the valve body 131 of the first valve device 130 and the second oil passage 311*c*, and flows into the first oil chamber Y1 as shown with the arrow D in FIG. 3. The flow of the oil from the reservoir chamber R toward the first oil chamber Y1 is throttled by the second valve 133 of the first valve device 130 and the second oil passage 311*c*, and the damping force during the compression stroke of the hydraulic shock absorbing apparatus 10 is obtained.

In the hydraulic shock absorbing apparatus 10 that has the above-mentioned configuration, during the compression stroke of the hydraulic shock absorbing apparatus 10, the oil in the first oil chamber Y1 flows into the reservoir chamber R through the first oil passage 311*b* of the valve body 131 and the concave portion 312*a* as shown with the arrow B in FIG. 2. For example, there is a concern that a liquid surface of the oil in the oil chamber Ro could ripple and the gas in the gas chamber Rg could be mixed with the oil to generate air bubbles as the piston 141 moves at a high speed.

During the expansion stroke of the hydraulic shock absorbing apparatus 10, the oil in the reservoir chamber R flows into the first oil chamber Y1 through the concave portion 312*a* of the valve body 131 of the first valve device 130 and the second oil passage 311*c* as shown with the arrow D in FIG. 3. In a case where the air bubbles are generated as described above, the air bubbles that are generated enter the first oil chamber Y1 in the inner cylinder 112 from the reservoir chamber R. In a case where the air bubbles enter the first oil chamber Y1, the air bubbles in the first oil chamber Y1 are crushed first during the subsequent compression stroke. Then, there is a concern that the damping force could not be generated while the air bubbles disappear or the generation of the damping force is delayed.

In view of the above-mentioned matters, the hydraulic shock absorbing apparatus 10 according to the embodiment has the following configuration. In other words, a protruding portion 120 protruding from the outer circumferential surface of the inner cylinder 112 toward the outer cylinder 111 is formed over the entire circumference of the outer circumferential surface. The protruding portion 120 that is formed on the inner cylinder 112 is formed in such a manner as to have a size not reaching the inner circumferential surface of the outer cylinder 111. However, a shape of a tip end of the protruding portion 120 when viewed in the center line direction may be a circular shape so that a gap between the tip end of the protruding portion 120 and the inner circumferential surface of the outer cylinder 111 is constant in the circumferential direction, and may be a polygonal shape so that the gap between the tip end of the protruding portion 120 and the inner circumferential surface of the outer cylinder 111 is not constant in the circumferential direction.

Figure 4A:
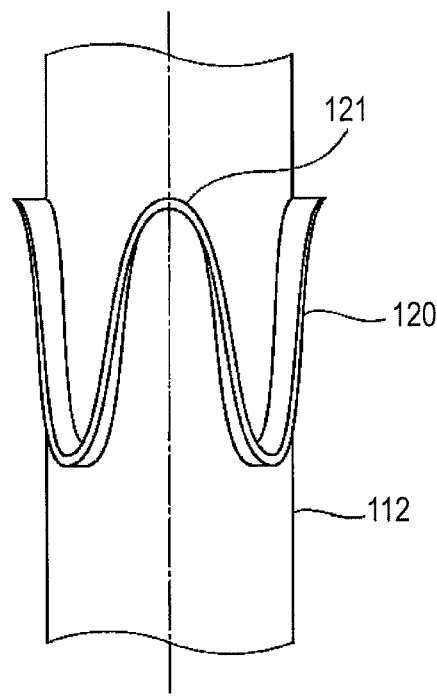
FIGS. 4A and 4B are diagrams showing a shape of a protruding portion.
Figure 4B:
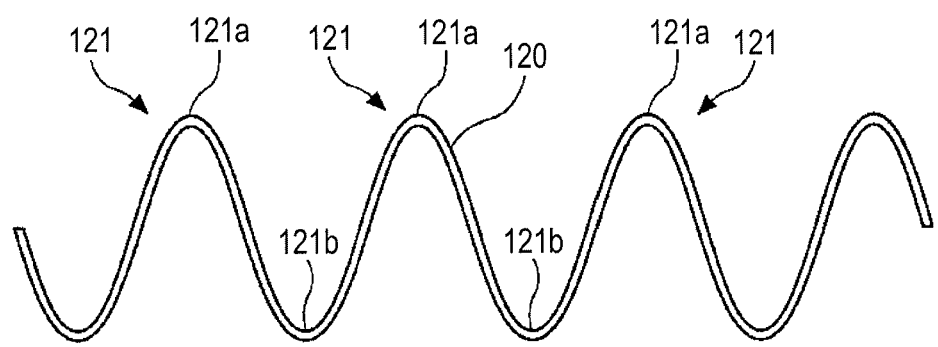

FIGS. 4A and 4B are diagrams showing a shape of the protruding portion 120. FIG. 4A is an external view showing the protruding portion 120, and FIG. 4B is a plan view showing the shape of the protruding portion 120 formed over the entire circumference of the outer circumferential surface that is viewed over the entire circumference from a direction orthogonal to the center line direction.

As shown in FIGS. 4A and 4B, the protruding portion 120 is formed in such a manner that the shape which is viewed from the direction (side portion) crossing the center line direction is a waveform. In other words, in the protruding portion 120, a convex portion 121 that is formed in such a manner that a width of an opening which is opened toward the one end portion side gradually decreases in the center line direction from the one end portion side of the center line direction toward the other end portion side is formed in a plural number at regular intervals in the circumferential direction. A bottom portion 121*b* that is formed in the convex portion 121 which is adjacent to a vertex 121*a* of the convex portion 121 is formed in an arc shape.

In the hydraulic shock absorbing apparatus 10 according to the embodiment that has the above-described configuration, as shown with the arrow B in FIG. 2, the oil moves up in the limited spaced in the convex portion 121 of the protruding portion 120 of the inner cylinder 112 during the compression stroke of the hydraulic shock absorbing apparatus 10 even when the oil in the first oil chamber Y1 flows into the reservoir chamber R, and thus the rippling on the liquid surface is suppressed and the generation of the air bubbles is suppressed. Also, since the protruding portion 120 is formed over the entire circumference of the outer circumferential surface of the inner cylinder 112 and the convex portions 121 are formed at regular intervals, it is possible to suppress concentration of the rippling on the liquid surface of the oil at certain points. Thus, the rippling on the liquid surface is reduced, and the generation of the air bubbles is suppressed. Therefore, with the hydraulic shock absorbing apparatus 10 according to the embodiment, it is possible to obtain the damping force in a stable manner.

The position of the protruding portion 120 of the inner cylinder 112 in the center line direction is set as follows. For example, in a case where the hydraulic shock absorbing apparatus 10 is installed on a suspension of a vehicle, the position of the liquid surface of the oil in the oil chamber Ro of the reservoir chamber R that is determined in response to the position of the piston 141 when expected standard weight is added to the suspension may be set between a central portion of the convex portion 121 of the protruding portion 120 and a slightly lower portion of the protruding portion 120. Even when the liquid surface of the oil in the oil chamber Ro goes up and down, the liquid surface is placed in the convex portion 121 of the protruding portion 120 or near thereof, and thus the rippling on the liquid surface can be more reliably suppressed, and the generation of the air bubbles can be reliably suppressed.

Figure 5A:
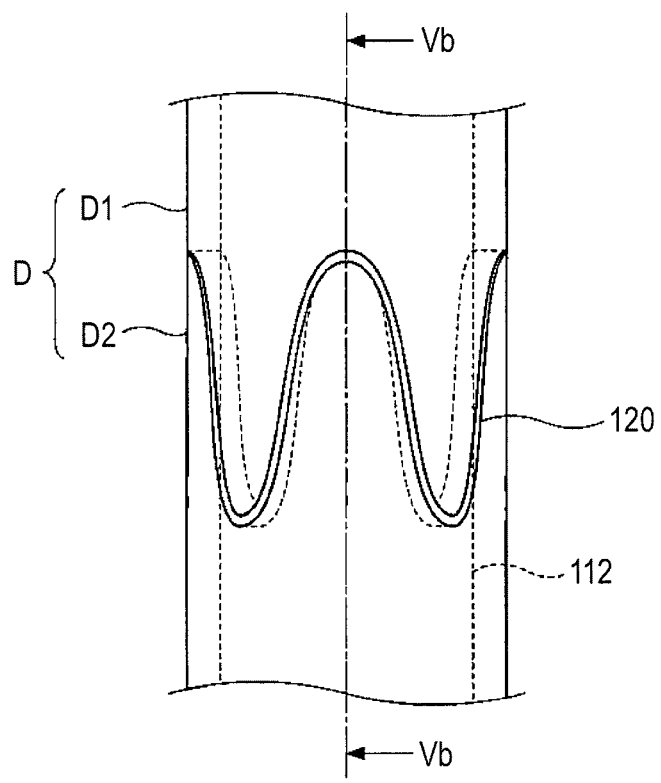
FIGS. 5A and 5B are diagrams showing a method for manufacturing an inner cylinder.
Figure 5B:
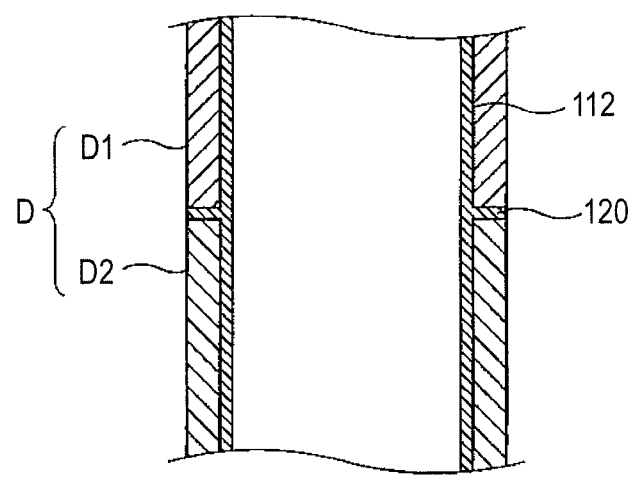

FIGS. 5A and 5B are diagrams showing a method for manufacturing the inner cylinder 112.

Since the protruding portion 120 of the inner cylinder 112 is formed over the entire circumference of the outer circumferential surface of the inner cylinder 112, the protruding portion can be molded by press working using a pair of dies D1 and D2 that slide in a reverse direction to the center line direction. In this manner, by molding the protruding portion 120 by press working, the protruding portion 120 can be molded with ease on the outer circumferential surface of the inner cylinder 112. When the protruding portion 120 is molded by press working, the inner cylinder 112 may have a non-annular shape (non-cylindrical shape) in a step prior to press working so that the protruding portion 120 has a waveform after press working. In molding the inner cylinder 112 during the step prior to press working for the protruding portion 120, any method may be used, including a known method for manufacturing a steel pipe. In a case where the inner circumferential surface of the inner cylinder 112 is not smooth due to the molding of the protruding portion 120 on the outer circumferential surface of the inner cylinder 112, a smooth surface may be disposed using a sleeve or the like.

Also, since the convex portions 121 of the protruding portion 120 are formed at regular intervals in the circumferential direction and the bottom portion 121b that is formed in the convex portion 121 which is adjacent to the vertex 121a of the convex portion 121 is formed in the arc shape, tip ends of the dies D1 and D2 can have a gradual shape, and a lifespan of the die can be lengthened. In this manner, costs for manufacturing the inner cylinder 112 can be reduced.

As described above, according to the hydraulic shock absorbing apparatus 10 related to the embodiment, the protruding portion 120 is formed in the inner cylinder 112, and thus the generation of the air bubbles in the oil can be suppressed, and the damping force can be obtained in a stable manner. Therefore, it is possible to manufacture the inner cylinder 112 that has the protruding portion 120, with which the generation of the air bubbles in the oil can be suppressed and the damping force can be obtained in a stable manner, with ease, and at a low cost.

Also, in the above-described embodiment, the protruding portion 120 that protrudes from the outer circumferential surface toward the outer cylinder 111 is formed over the entire circumference of the outer circumferential surface in the inner cylinder 112. The entire circumference conceptually includes almost the entire circumference. Specifically, the protruding portion 120 may be decoupled at one point or two points in the circumferential direction.

Also, in the above-described embodiment, the protruding portion 120 that protrudes toward the reservoir chamber R is disposed in the inner cylinder 112, but the present invention is not limited thereto. In the outer cylinder 111, the protruding portion 120 that protrudes from the inner circumferential surface toward the inner cylinder 112 may be formed over the entire circumference of the inner circumferential surface. Even in this case, the generation of the air bubbles in the oil can be suppressed, and the damping force can be obtained in a stable manner. Also, since it is possible to mold the protruding portion by press working using the pair of molds that slide in the reverse direction to the center line direction, the outer cylinder 111 that has the protruding portion 120 can be manufactured with ease and at a low cost.

Another Embodiment 1

In the above-described embodiment, in either one of the inner cylinder 112 and the outer cylinder 111, the protruding portion 120 that protrudes toward the other cylinder is integrally formed over the entire circumference, but the present invention is not limited thereto. For example, the protruding portion may be molded separately from the cylinder, and an object that functions as the protruding portion may be coupled with the cylinder by welding or the like.

Figure 6A:
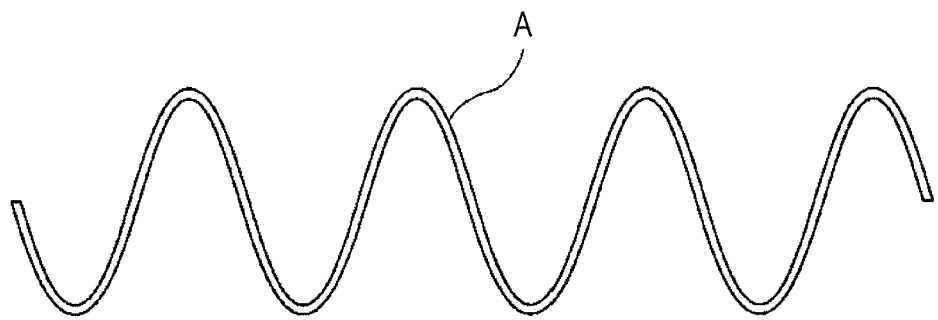
FIGS. 6A to 6C are diagrams showing a process for manufacturing an inner cylinder according to another embodiment 1.
Figure 6B:
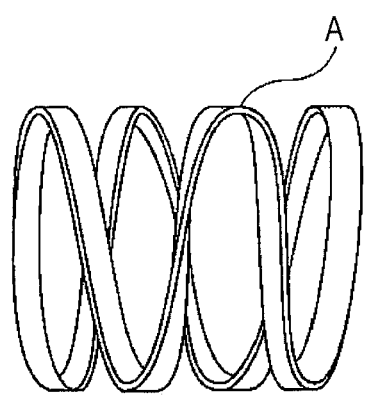
Figure 6C:
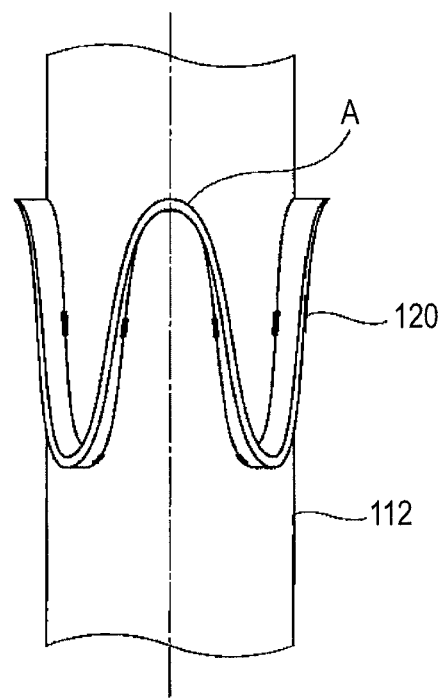

FIGS. 6A to 6C are diagrams showing a process for manufacturing the inner cylinder 112 according to another embodiment 1.

An object A that has the planar shape shown in FIG. 6A is molded separately from a main body of the inner cylinder 112, and the object A has an annular shape as shown in FIG. 6B. As shown in FIG. 6C, the annular-shaped object A is welded to the outer circumferential surface of the main body of the inner cylinder 112 to form the protruding portion 120. The annular-shaped object A is welded to the inner circumferential surface of a main body of the outer cylinder 111 to form the protruding portion 120.

Another Embodiment 2

FIGS. 7A to 7E are diagrams showing an object A according to another embodiment 2.

As shown in FIG. 7A, the object A according to another embodiment 2 is a flat plate-shaped object configured of an upper end portion A1, a lower end portion A2, and a plurality of ribs A3 that are formed obliquely in such a manner as to connect the upper end portion A1 with the lower end portion A2. As shown in FIG. 7B or FIG. 7D, the object A has the annular shape, and the annular-shaped object A is coupled with the outer circumferential surface of the main body of the inner cylinder 112 or the inner circumferential surface of the main body of the outer cylinder 111. In addition, during a step prior to coupling the flat-shaped object A with either one of the inner cylinder 112 and the outer cylinder 111, the plurality of ribs A3 may be deformed in such a manner as to protrude toward the other cylinder. For example, as shown in FIG. 7C, a cross section of the rib A3 may have a mountain shape in which the central portion protrudes, or, as shown in FIG. 7E, the cross section of the rib A3 may have an L shape in which a horizontal end portion protrudes.

Another Embodiment 3

Figure 8A:
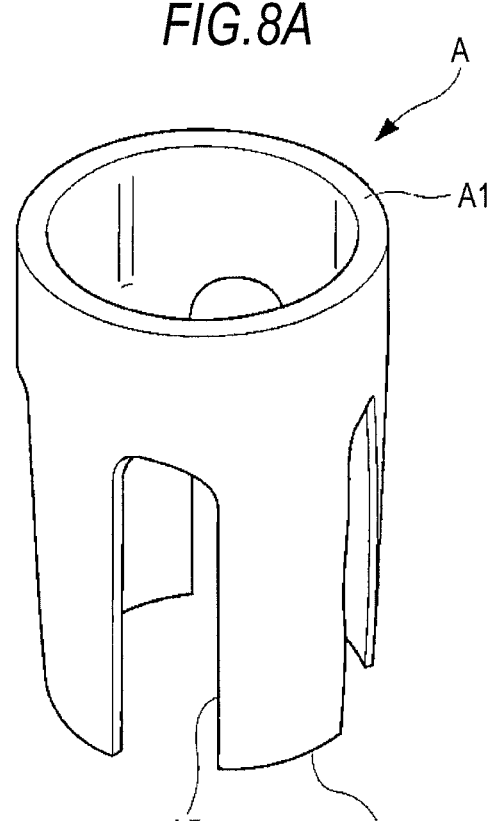
FIGS. 8A and 8B are diagrams showing an object according to another embodiment 3.
Figure 8B:
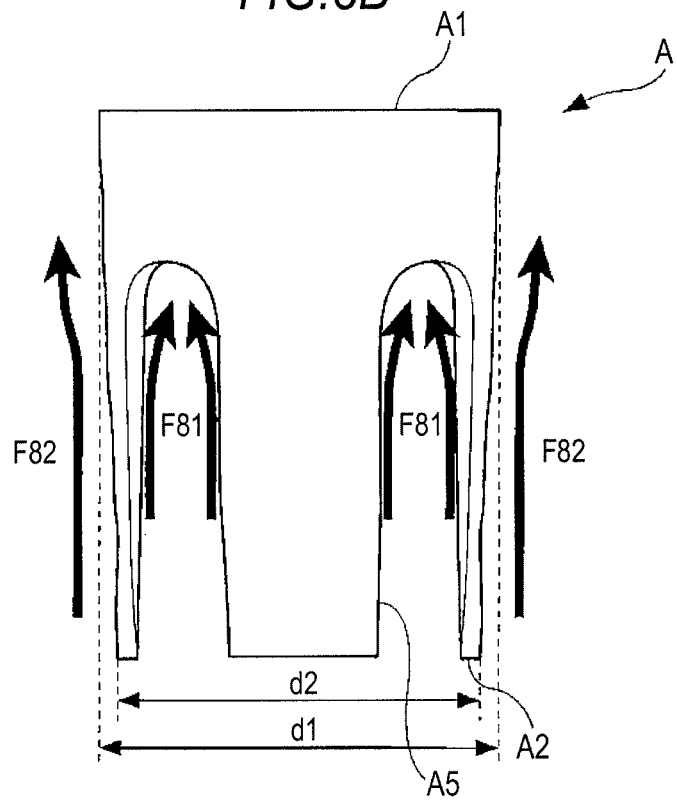

FIGS. 8A and 8B are diagrams showing the object A according to another embodiment 3.

As shown in FIG. 8A, the object (protruding member) A according to another embodiment 3 is an annular object formed of metal, resin or the like, and is disposed in such a manner as to be coupled with the outer circumferential surface of the main body of the inner cylinder 112 or the inner circumferential surface of the main body of the outer cylinder 111. Here, the meaning of "annular" conceptually includes "approximately annular". Also, the object A may be disposed in such a manner as to be coupled with the outer circumferential surface of the main body of the inner cylinder 112 and the inner circumferential surface of the main body of the outer cylinder 111, or may be disposed in such a manner as not to be fixed between the outer circumferential surface of the main body of the inner cylinder 112 and the inner circumferential surface of the main body of the outer cylinder 111 but to be simply inserted therebetween.

As shown in FIG. 8B, the object A has the upper end portion A1 and the lower end portion A2, and is formed in such a manner that an outer diameter thereof gradually increases in the center line direction of the object A from the lower end portion A2 side toward the upper end portion A1 side (refer to diameters d1 and d2 in FIG. 8B). In other words, a gradually rising inclined surface is formed from the lower end portion A2 side toward the upper end portion A1 side.

According to the object A that has the above-described configuration, a gap that is formed between the inner circumferential surface of the main body of the outer cylinder 111 and the outer circumferential surface of the object A decreases in the center line direction from the lower end portion A2 (one end portion) side in the center line direction toward the upper end portion A1 (the other end portion) side.

Also, in the object A, a notch A5 whose longitudinal direction from the lower end portion A2 is disposed along the center line direction and which extends from the lower end portion A2 side in the center line direction toward the upper end portion A1 is formed in a plural number in the circumferential direction. A width of a tip end portion of the notch A5 gradually decreases in the center line direction. In the example that is shown, the plurality of notches A5 are formed at regular intervals in the circumferential direction.

In the object A that has the above-mentioned configuration, as shown in the arrow B in FIG. 2, the oil moves up in the limited space in the notch A5 of the object A even when the oil in the first oil chamber Y1 flows into the reservoir chamber R during the compression stroke of the hydraulic shock absorbing apparatus 10 (refer to the arrow F81). Also, the oil is guided to the inner circumferential surface of the main body of the outer cylinder 111 while moving up in the space between the inner circumferential surface of the main body of the outer cylinder 111 and the outer circumferential surface of the object A (refer to the arrow F82). Therefore, the rippling on the liquid surface is suppressed, and the generation of the air bubbles is suppressed.

In the object A of the example that is shown, an outer diameter of the upper end portion A1 side is formed in such a manner as to be larger than an outer diameter of the lower end portion A2 side in the center line direction, and the notch A5 that extends from the lower end portion A2 side toward the upper end portion A1 side is disposed. However, the present invention may satisfy either one of the larger diameter and the notch. In other words, in the object A, the outer diameter of the upper end portion A1 side may be formed in such a manner as to be larger than the outer diameter of the lower end portion A2 side in the center line direction, or the notch A5 that extends from the lower end portion A2 side toward the upper end portion A1 side may be disposed in the object A.

Also, in the object A of the example that is shown, the outer diameter of the upper end portion A1 side is formed in such a manner as to be larger than the outer diameter of the lower end portion A2 side in the center line direction. However, instead of this configuration or in addition to this configuration, an inner diameter of the upper end portion A1 side may be formed in such a manner as to be smaller than an inner diameter of the lower end portion A2 side in the center line direction. Using this configuration, the oil is guided toward the outer circumferential surface of the inner cylinder 112 while moving up in the space between the inner circumferential surface of the object A and the outer circumferential surface of the inner cylinder 112.

Another Embodiment 4

Figure 9A:
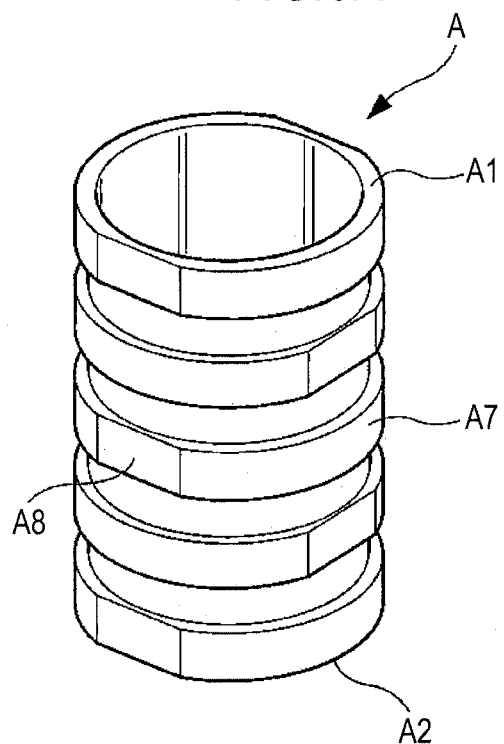
FIGS. 9A and 9B are diagrams showing an object according to another embodiment 4.
Figure 9B:
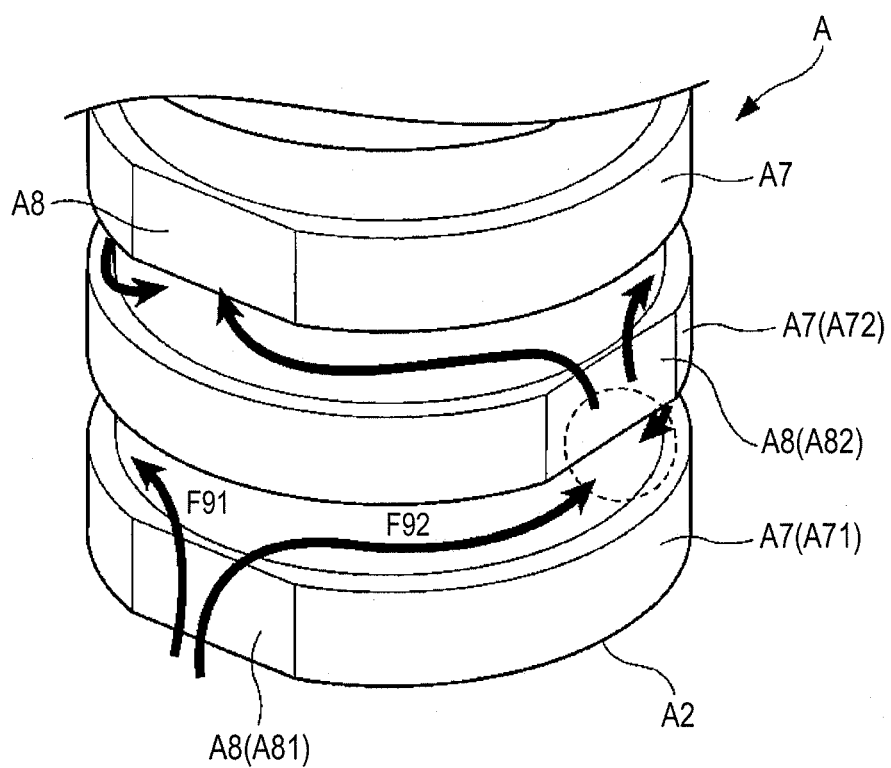

FIGS. 9A and 9B are diagrams showing the object A according to another embodiment 4.

As shown in FIG. 9A, the object A according to another embodiment 4 is an annular object and is disposed in such a manner as to be coupled with the outer circumferential surface of the main body of the inner cylinder 112 or the inner circumferential surface of the main body of the outer cylinder 111. Here, the meaning of "annular" conceptually includes "approximately annular". Also, the object A may be disposed in such a manner as to be coupled with the outer circumferential surface of the main body of the inner cylinder 112 and the inner circumferential surface of the main body of the outer cylinder 111, or may be disposed in such a manner as not to be fixed between the outer circumferential surface of the main body of the inner cylinder 112 and the inner circumferential surface of the main body of the outer cylinder 111 but to be simply inserted therebetween.

As shown in FIG. 9A, the object A has a plurality of protruding portions A7 provided in the center line direction of the object A. The protruding portion A7 protrudes outside the center line from the outer circumferential surface and extends over the circumferential direction of the center line to have the annular shape.

Also, each of the protruding portions A7 has a flat portion (immersion portion) A8 where a part in the circumferential direction is formed at a position immersing toward the center line side. In the example that is shown, two flat portions A8 are disposed in each of the protruding portions A7 at positions facing each other with the center line interposed therebetween. Also, in the example that is shown, the flat portion A8 is a flat surface, but another shape may be used if the outer circumferential surface of the protruding portion A7 is recessed further toward the center line side than the other portions.

Also, the flat portions A8 of the protruding portions A7 that are adjacent to each other in the center line direction are placed in such a manner as to have positions shifted in the circumferential direction of the center line. In the example that is shown, the flat portions A8 of the protruding portions A7 that are adjacent to each other in the center line direction are shifted from each other by approximately 90 degrees with respect to the center line.

In the object A that has the above-mentioned configuration, as shown with the arrow B in FIG. 2, the oil flows as follows in a case where the oil in the first oil chamber Y1 flows into the reservoir chamber R during the compression stroke of the hydraulic shock absorbing apparatus 10. In other words, as shown in FIG. 9B, the upward movement of the oil in the space between the inner circumferential surface of the main body of the outer cylinder 111 and the outer circumferential surface of the object A is suppressed by a protruding portion A71. In the meantime, a flat portion A81 is formed in the protruding portion A71 as described above, and thus some of the oil passes through the flat portion A81 and moves up.

The oil that passes through the flat portion A81 moves along the circumferential direction while the upward flow is suppressed by the adjacent protruding portion A72. As the oil proceeds along the circumferential direction, a flow path of the oil is lengthened, and, as a result, the air bubbles that are generated in the oil may disappear. So to speak, the oil flows along the circumferential direction, and thus time for the air bubbles to disappear is earned.

In this manner, the oil passes through the limited space between the inner circumferential surface of the main body of the outer cylinder 111 and the outer circumferential surface of the object A, and thus the rippling on the liquid surface is suppressed, and the generation of the air bubbles is suppressed.

For example, when the upward movement of the oil is restricted by the adjacent protruding portion A72, the oil that passes through the flat portion A81 of the protruding portion A71 moves from the flat portion A81 toward opposite directions along the circumferential direction (refer to the arrow F91 and the arrow F92).

The oil that moves in the opposite directions along the circumferential direction collides with the oil that moves from reverse direction (refer to the circular section in the drawing). The oils colliding with each other in this manner, and the flows of the oils are canceled. As a result, the rippling on the liquid surface is suppressed, and the generation of the air bubbles is suppressed.

Also, the object A of the example that is shown has the plurality of protruding portions A7 provided in the center line direction of the object A. The protruding portion A7 protrudes outside the center line from the outer circumferential surface and extends over the circumferential direction of the center line to have the annular shape. However, instead of this configuration or in addition to this configuration, the plurality of protruding portions A7 that protrude inside the center line from the inner circumferential surface and extend over the circumferential direction of the center line to have annular shapes may be provided in the center line direction. Even in this configuration, the immersion portion A8 that is immersed in part of the protruding portion A7 in the circumferential direction is formed in each of the plurality of the protruding portions A7, and the positions in the circumferential directions are shifted from each other. Using this configuration, the upward movement of the oil in the space between the inner circumferential surface of the object A and the outer circumferential surface of the inner cylinder 112 is suppressed.

Another Embodiment 5

Figure 10A:
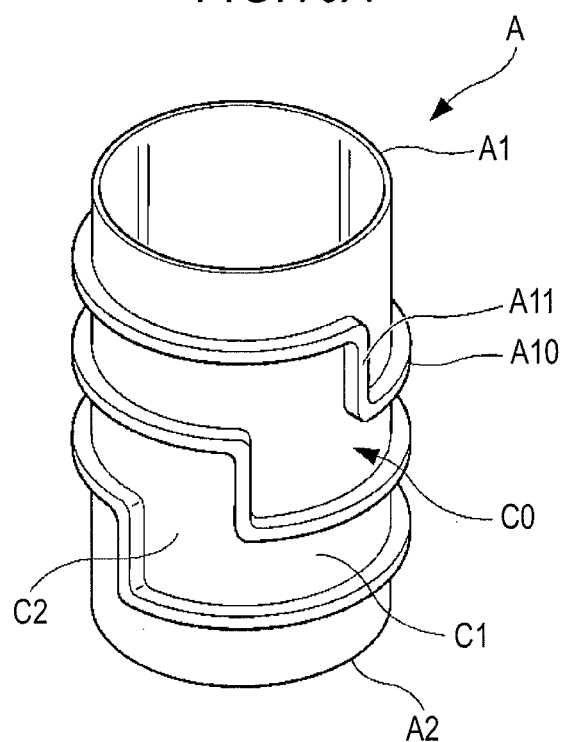
FIGS. 10A and 10B are diagrams showing an object according to another embodiment 5.
Figure 10B:
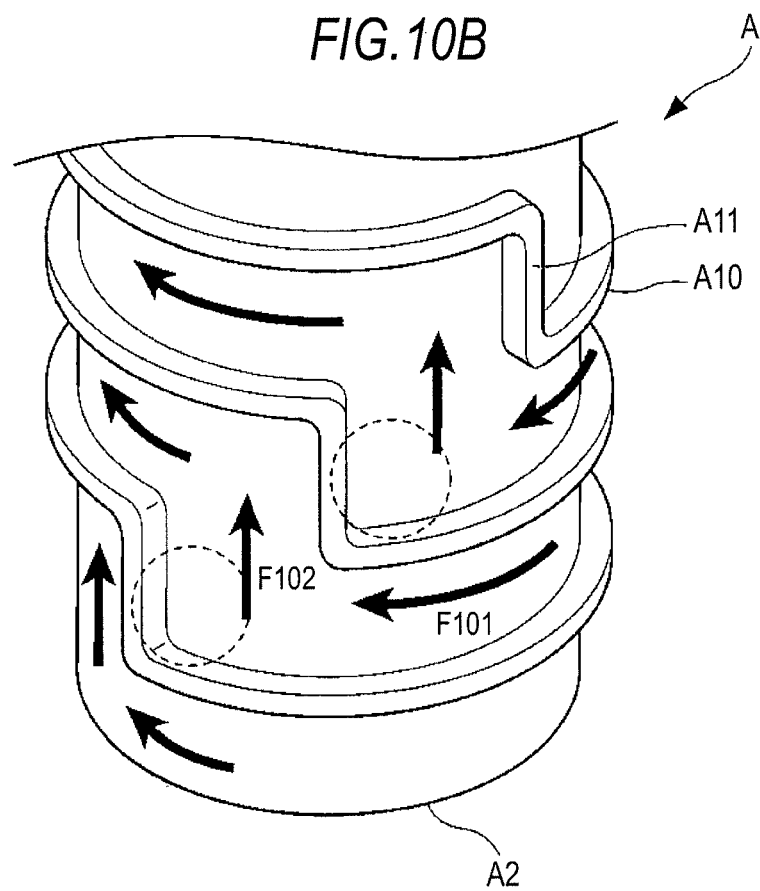

FIGS. 10A and 10B are diagrams showing the object A according to another embodiment 5.

As shown in FIG. 10A, the object A according to another embodiment 5 is an annular object and is disposed in such a manner as to be coupled with the outer circumferential surface of the main body of the inner cylinder 112 or the inner circumferential surface of the main body of the outer cylinder 111. Here, the meaning of "annular" conceptually includes "approximately annular". Also, the object A may be disposed in such a manner as to be coupled with the outer circumferential surface of the main body of the inner cylinder 112 and the inner circumferential surface of the main body of the outer cylinder 111, or may be disposed in such a manner as not to be fixed between the outer circumferential surface of the main body of the inner cylinder 112 and the inner circumferential surface of the main body of the outer cylinder 111 but to be simply inserted therebetween.

As shown in FIG. 10A, the object A has a circumferential direction protruding portion A10 that protrudes outside the center line of the object A from the outer circumferential surface and extends in an arc shaped over the circumferential direction of the center line, and a bent protruding portion A11 that is connected with a circumferential direction end portion of the circumferential direction protruding portion A10 and extends in the center line direction. A combination of the circumferential direction protruding portion A10 and the bent protruding portion A11 is disposed in a plural number and in a continuous manner in the center line direction.

A flow path C0 where the oil flows is formed between the adjacent combinations among the plurality of combinations of the circumferential direction protruding portion A10 and the bent protruding portion A11. In the example that is shown, the flow path C0 includes a circumferential direction flow path (circumferential direction portion) C1 that extends in the circumferential direction, and a bent flow path (bent portion) C2 that continues to the circumferential direction flow path C1 and extends in the center line direction.

So to speak, the stepwise flow path C0 is formed along the circumferential direction of the center line from the lower end portion A2 side in the center line direction toward the upper end portion A1 side.

In the object A that has the above-described configuration, as shown with the arrow B in FIG. 2, the upward flow of the oil in the space between the inner circumferential surface of the main body of the outer cylinder 111 and the outer circumferential surface of the object A is suppressed by the circumferential direction protruding portion A10 in a case where the oil in the first oil chamber Y1 flows into the reservoir chamber R during the compression stroke of the hydraulic shock absorbing apparatus 10.

As shown in FIG. 10B, the oil whose flow is suppressed by the circumferential direction protruding portion A10 flows along the circumferential direction flow path C1. Herein, as the oil proceeds along the circumferential direction flow path C1 (refer to the arrow F101), the flow path of the oil is lengthened and thus the air bubbles that are generated in the oil may disappear. So to speak, the oil flows along the circumferential direction, and thus time for the air bubbles to disappear is earned.

Next, the oil that proceeds along the circumferential direction flow path C1 collides with the bent protruding portion A11 and the flow of the oil is restricted. The oil that collides with the bent protruding portion A11 moves up along the bent flow path C2 (refer to the arrow F102), and flows through the adjacent circumferential direction flow path C1.

In this manner, the oil passes through the limited space between the inner circumferential surface of the main body of the outer cylinder 111 and the outer circumferential surface of the object A, and thus the rippling on the liquid surface is suppressed, and the generation of the air bubbles is suppressed.

Also, the object A of the example that is shown has the circumferential direction protruding portion A10 that protrudes outside the center line from the outer circumferential surface, and the bent protruding portion A11 that is connected to the circumferential direction end portion of the circumferential direction protruding portion A10. However, instead of this configuration or in addition to this configuration, the object may have the circumferential direction protruding portion A10 that protrudes inside the center line from the inner circumferential surface, and the bent protruding portion A11 that is connected to the circumferential direction end portion of the circumferential direction protruding portion A10. Using this configuration, the upward movement of the oil in the space between the inner circumferential surface of the object A and the outer circumferential surface of the inner cylinder 112 is suppressed.

Another Embodiment 6

Figure 11A:
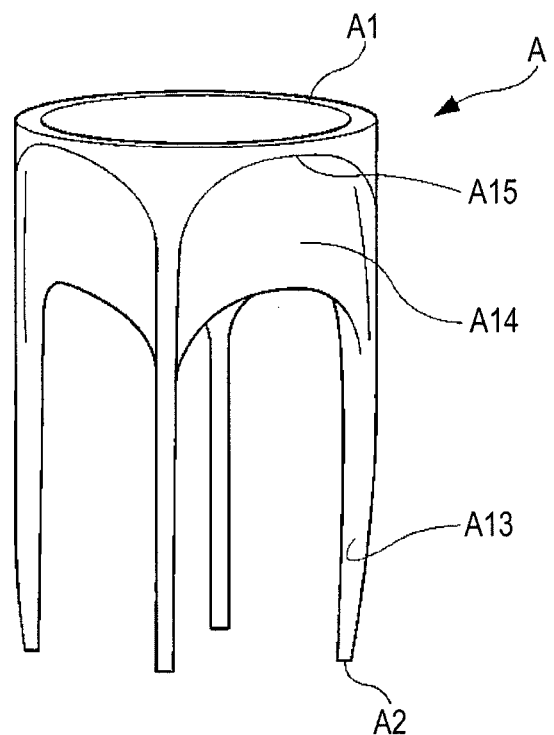
FIGS. 11A and 11B are diagrams showing an object according to another embodiment 6.
Figure 11B:
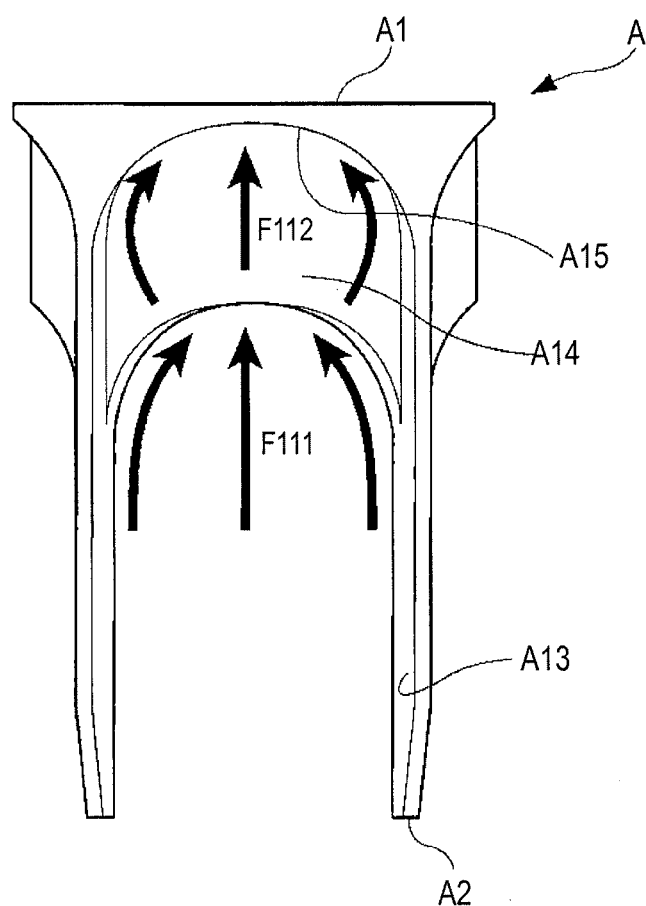

FIGS. 11A and 11B are diagrams showing the object A according to another embodiment 6.

Figure 12:
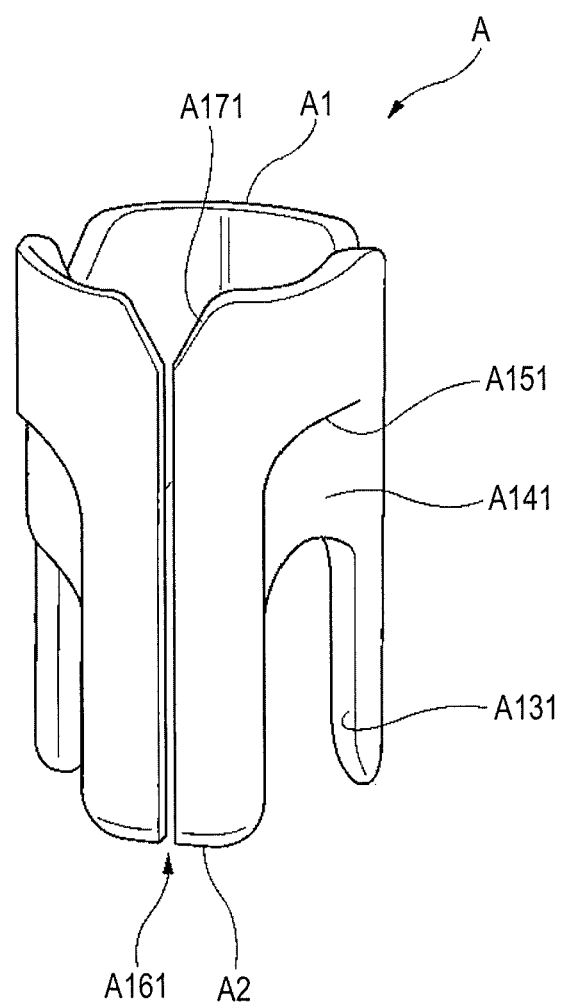
FIG. 12 is a diagram showing a modification example of the object according to the another embodiment 6.

FIG. 12 is a diagram showing a modification example of the object A according to another embodiment 6.

As shown in FIG. 11A, the object (protruding member) A according to another embodiment 6 is an annular object and is disposed in such a manner as to be coupled with the outer circumferential surface of the main body of the inner cylinder 112 or the inner circumferential surface of the main body of the outer cylinder 111. Here, the meaning of "annular" conceptually includes "approximately annular". Also, the object A may be disposed in such a manner as to be coupled with the outer circumferential surface of the main body of the inner cylinder 112 and the inner circumferential surface of the main body of the outer cylinder 111, or may be disposed in such a manner as not to be fixed between the outer circumferential surface of the main body of the inner cylinder 112 and the inner circumferential surface of the main body of the outer cylinder 111 but to be simply inserted therebetween.

As shown in FIG. 11B, the object A has the upper end portion A1 and the lower end portion A2, and a notch A13 whose longitudinal direction from the lower end portion A2 is disposed along the center line direction and which extends from the lower end portion A2 side in the center line direction toward the upper end portion A1 is formed in a plural number in the circumferential direction. A width of a tip end portion of the notch A13 gradually decreases in the center line direction. In the example that is shown, the plurality of notches A13 are formed at regular intervals in the circumferential direction.

Also, a concave portion A14 that is disposed in the width of the notch A13 and whose outer circumferential surface is immersed in the center line direction is provided at a position continuing from the tip end portion of the notch A13. On the upper end portion A1 side of the concave portion A14, a narrow portion A15 is disposed in such a manner that a width thereof gradually decreases in the center line direction.

In the object A that has the above-described configuration, as shown with the arrow B in FIG. 2, the oil moves up in the limited space in the notch A13 of the object A even when the oil in the first oil chamber Y1 flows into the reservoir chamber R during the compression stroke of the hydraulic shock absorbing apparatus 10 (refer to the arrow F111).

Also, the oil that moves up in a restricted manner in the notch A13 moves up in the space between the inner circumferential surface of the main body of the outer cylinder 111 and the outer circumferential surface of the object A in a further restricted manner due to the presence of the concave portion A14 and the narrow portion A15 (refer to the arrow F112). Therefore, the rippling on the liquid surface is suppressed, and the generation of the air bubbles is suppressed.

In the object A of the example that is shown, the concave portion A14 that is disposed in the width of the notch A13 and whose outer circumferential surface is immersed in the center line direction is provided at the position continuing from the tip end portion of the notch A13. However, instead of this configuration or in addition to this configuration, the concave portion A14 that is disposed in the width of the notch A13 and whose inner circumferential surface is immersed radially outside may be provided at the position continuing from the tip end portion of the notch A13. Using this configuration, the oil is guided toward the outer circumferential surface of the inner cylinder 112 while moving up in the space between the inner circumferential surface of the object A and the outer circumferential surface of the inner cylinder 112.

Also, in the object A of the example that is shown, the plurality of notches A13 are formed at regular intervals in the circumferential direction. However, for example, the intervals may be varied by expanding the width of some of the notches A13 in the circumferential direction.

Furthermore, for example, the object A may have the configuration shown in FIG. 12.

The width of the plurality of notches A131 in the circumferential direction is narrower in the object A shown in FIG. 12 than in the object A shown in FIGS. 11A and 11B. Also, in the object A, the concave portion A141 that is disposed in the width of the notch A131 and whose outer circumferential surface is immersed in the center line direction, and the narrow portion A151 whose width gradually decreases in the center line direction on the upper end portion A1 side of the concave portion A141 are disposed. Also, the object A shown in FIG. 12 has a groove portion A161 that is formed along the center line of the object A and is formed in such a manner as to penetrate a thickness direction of the object A, and a V-shaped notch A171 that extends from the upper end portion A1 of the object A toward the lower end portion A2.

When the object A is deformed, the groove portion A161 absorbs distortion in the circumferential direction. Also, the notch A171 is a portion where a jig or the like is hung when the object A is mounted and positioning in the circumferential direction is performed.

Also, in the embodiment, the object A suppresses the generation of the air bubbles over the two steps in which the narrow portion A151 and the concave portion A141 are disposed. However, the present invention is not limited thereto. The generation of the air bubbles may be suppressed by the narrow portion A151 (in short, over one step) without the concave portion A141 being disposed, or the generation of the air bubbles may be suppressed over multiple steps with the concave portion in addition to the concave portion A141 being further disposed. Furthermore, although the description has been made with regard to the object A shown in FIG. 12 herein, the same description is applied to the object A shown in FIGS. 11A and 11B.

Others

Figure 13:
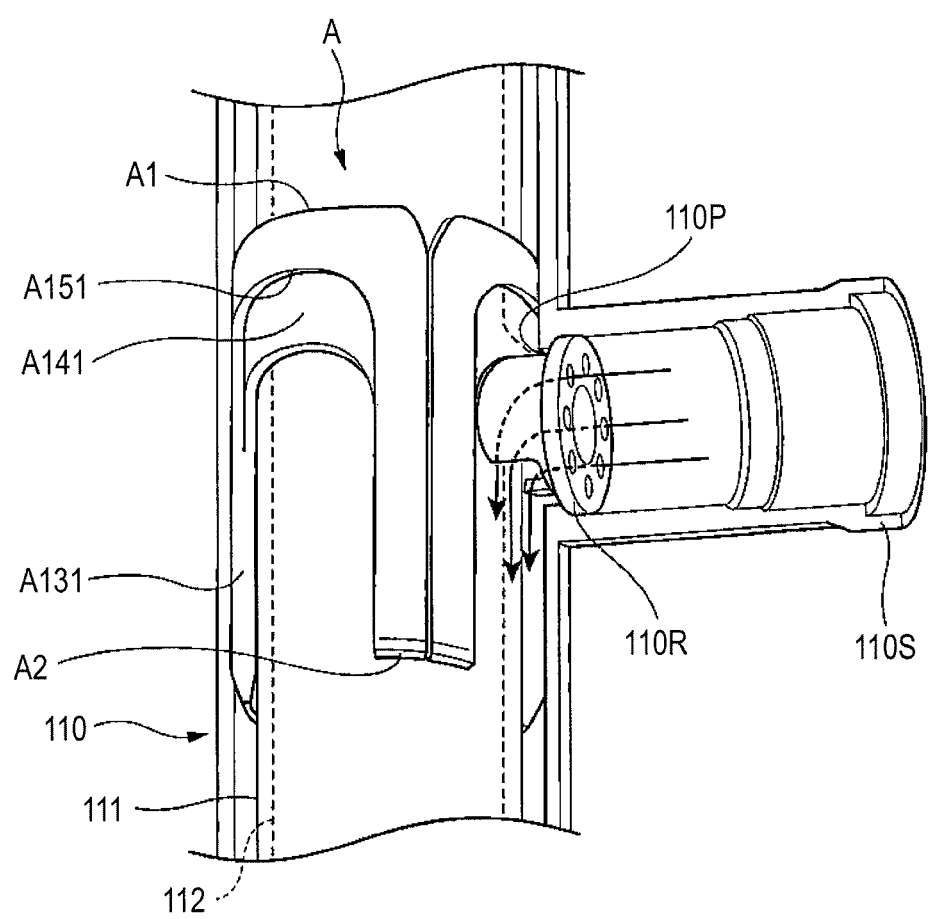
FIG. 13 is a diagram showing an example of installation of the object.

FIG. 13 is a diagram showing an example of installation of the object A. The object A shown in FIG. 13 has a configuration corresponding to the object A in FIG. 12.

In the above description, the object A is disposed near the liquid surface. However, for example, the object A may be disposed at a position shown in FIG. 13.

In other words, as shown in FIG. 13, the object A may be disposed in a so-called triple tube structure where each of the inner cylinder 112, the outer cylinder 111, and a damper case 110 is configured in a cylindrical shape.

Herein, the object A is disposed between the outer circumferential surface of the outer cylinder 111 and an inner circumferential surface of the damper case 110. Also, in the example that is shown, an opening 110P is formed in a side portion of the damper case 110, and a solenoid cylinder 110S where the oil from a solenoid (not shown) flows is connected to the opening 110P. Also, in the opening 110P, an annular member 110R is disposed in such a manner as to be coupled with the outer circumferential surface of the outer cylinder 111. Here, the meaning of "annular" conceptually includes "approximately annular".

Also, the object A is disposed at a position where a space inside the annular member 110R is opened toward the notch A131.

In the above-described configuration, the oil discharged from a solenoid valve (not shown) flows into the damper case 110 via the solenoid cylinder 110S and the opening 110P. The object A guides the oil that flows in along the notch A131, and restricts the oil so that the oil flows in one direction. In other words, the oil flows from the upper end portion A1 toward the lower end portion A2 (refer to the arrow in the drawing).

For example, the movement of the oil flowing from the opening 110P toward the upper end portion A1 of the object A is restricted, the oil accumulates in an end-portion of the notch A131, and the air bubbles are suppressed.

Figure 14:
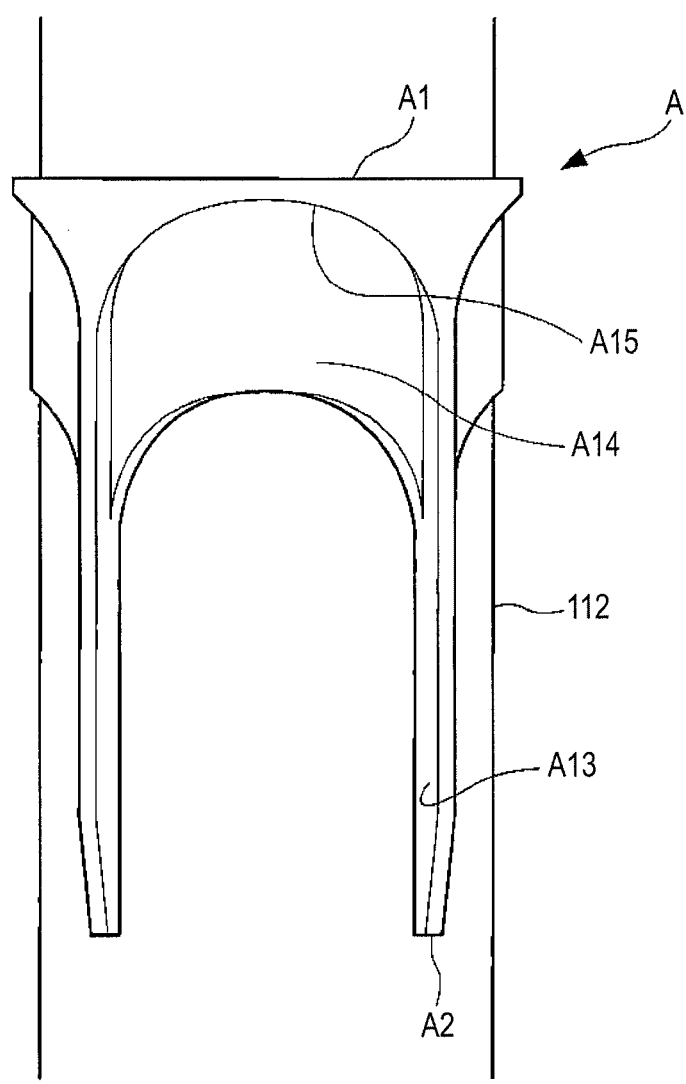
FIG. 14 is a diagram showing a method for manufacturing the object.

FIG. 14 is a diagram showing a method for manufacturing the object A. The object A shown in FIG. 14 has a configuration corresponding to the object A in FIGS. 11A and 11B.

Figure 15:
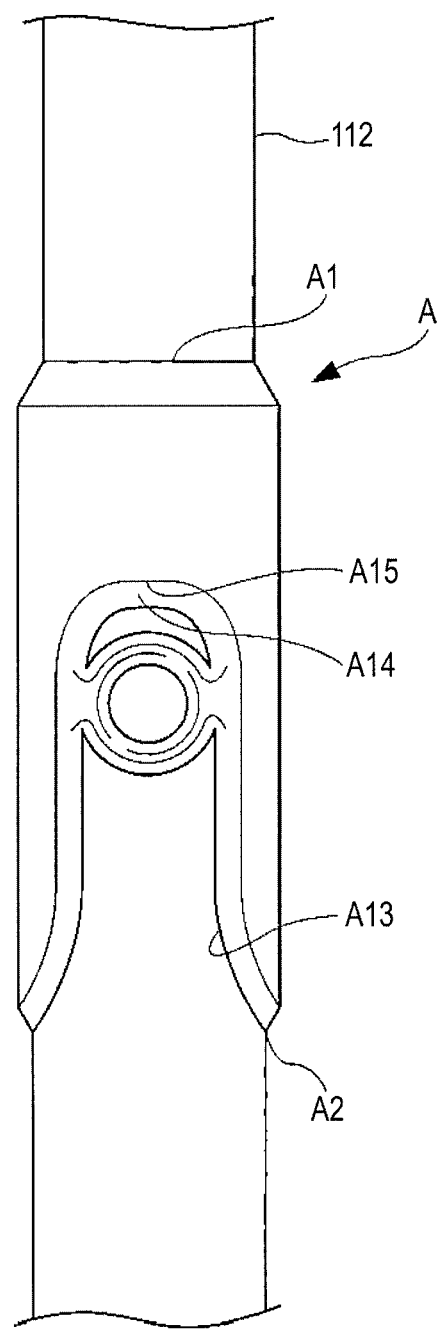
FIG. 15 is a diagram showing another method for manufacturing the object.

FIG. 15 is a diagram showing another method for manufacturing the object A.

In the above description, the object A is formed separately from the outer cylinder 111 and the inner cylinder 112, and then is coupled with the outer cylinder 111 or the inner cylinder 112. However, the object may be formed into a single unit with the outer cylinder 111 or the inner cylinder 112.

For example, as shown in FIG. 14, the object A of the inner cylinder 112 may be integrally molded by press working or the like. In this manner, by integrally molding the shape of the object A with the inner cylinder 112 by press working, the object A can be molded with ease on the outer circumferential surface of the inner cylinder 112.

According to the configuration in FIG. 14, the object A shown in FIGS. 11A and 11B is integrally molded with the inner cylinder 112. However, the present invention is not limited thereto. Some of the notches A13 may have different gaps in the circumferential direction, and, for example, the object A shown in FIG. 12 may be integrally molded with the inner cylinder 112. Also, the configuration shown in FIG. 15 may be applied.

Moreover, in the configuration in which the object A is integrally molded with the inner cylinder 112, a part of the inner cylinder 112 may be configured in such a manner as to be immersed radially inward, or a part of the inner cylinder 112 may be configured in such a manner as to protrude radially outward. In short, relative unevenness in the radially direction may be configured in the inner cylinder 112 and the like so as to guide the flow of the oil and form the notch A13, the concave portion A14, and the narrow portion A15 that suppress the rippling on the liquid surface.

What is claimed is:

1. A hydraulic shock absorbing apparatus comprising:
    an inner tube;
    an outer tube that is placed outside the inner tube in such a manner as to cover an outer circumferential surface of the inner tube;
    a damper case that covers an outer circumferential surface of the outer tube; and
    an annular protruding member disposed in a space that is defined between the outer circumferential surface of the outer tube and an inner circumferential surface of the damper case, and in which a liquid and gas are filled, the protruding member extending from one end side thereof to another end side thereof,
    wherein notches are formed in the protruding member in a circumferential direction of the protruding member, each notch extending from the one end side toward the other end side without reaching the other end side in a center line direction of the protruding member,
    wherein each of the notches has a closed end that is spaced from the one end side and from the other end side, and
    wherein the inner tube penetrates through the protruding member.

2. The hydraulic shock absorbing apparatus according to claim 1,
    wherein the protruding member has at least one of a first configuration and a second configuration,
    in the first configuration, the protruding member is formed with a concave portion that is disposed at a position between the other end side of the protruding member and the closed end of the notch and is disposed on an outer circumferential surface side of the protruding member, and
    in the second configuration, the protruding member is formed with a concave portion that is disposed at a position between the other end side of the protruding member and the closed end of the notch and is disposed on an inner circumferential surface side of the protruding member.

3. The hydraulic shock absorbing apparatus according to claim 1,
    wherein the protruding member further comprises a narrow portion that has a circumferential width that gradually decreases in the center line direction.

4. The hydraulic shock absorbing apparatus according to claim 2,
    wherein an outer circumferential surface of the concave is immersed in a radial direction toward a center line of the protruding member.

5. The hydraulic shock absorbing apparatus according to claim 1,
    wherein the protruding member has at least one groove portion extending along a center line of the protruding member which is formed in such a manner as to penetrate into the protruding member from one end side through the other end side thereof.

6. The hydraulic shock absorbing apparatus according to claim 1, further comprising a solenoid cylinder that is disposed at a position communicating with the protruding member.

7. The hydraulic shock absorbing apparatus according to claim 1, wherein
    the fluid flows into the damper case via the solenoid cylinder, and
    the protruding member guides the flowed fluid in one direction.

* * * * *